March 1, 1955 A. S. VOLPIN Re. 23,957

QUICK SEALING AUTOMATIC SEALING GATE VALVE

Original Filed Aug. 27, 1951 3 Sheets-Sheet 1

Alexander S. Volpin
INVENTOR.

BY

ATTORNEY

QUICK SEALING AUTOMATIC SEALING GATE VALVE

Original Filed Aug. 27, 1951 3 Sheets-Sheet 2

Alexander S. Volpin
INVENTOR.

BY

ATTORNEY

March 1, 1955 A. S. VOLPIN Re. 23,957

QUICK SEALING AUTOMATIC SEALING GATE VALVE

Original Filed Aug. 27, 1951 3 Sheets-Sheet 3

Alexander S. Volpin
INVENTOR.

BY

ATTORNEY

United States Patent Office

Re. 23,957
Reissued Mar. 1, 1955

23,957

QUICK SEALING AUTOMATIC SEALING GATE VALVE

Alexander S. Volpin, Miami Beach, Fla.

Original No. 2,660,397, dated November 24, 1953, Serial No. 243,882, August 27, 1951. Application for reissue April 8, 1954, Serial No. 421,994

8 Claims. (Cl. 137—246.12)

Matter enclosed in heavy brackets [ ] appears in the original patent but forms no part of this reissue specification; matter printed in italics indicates the additions made by reissue

This invention *relates to automatic sealing lubricated valves and in particular* relates to a quick automatic sealing gate valve which is particularly adapted for maintaining a seal on a flow line at the downstream flow port, which is automatically sealed due to differential pressure across the area being sealed.

Various types of automatic lubricated sealing gate valves have been devised heretofore, but it has been found in actual practice that, contrary to the usual expectation, the sealing material, in instances, does not flow from the reservoir into the distribution groove to maintain a seal. This is particularly true if there is a small leak. Theoretically one would suppose that if there is leakage at the down stream flow passage, then the sealing material in the reservoir would follow such reduction in pressure and flow into the down stream sealing groove, but it has been found, in instances, that where such leak occurs the sealing material does not, as a matter of fact, flow in response to a slight reduction in pressure due to such leakage, and the distribution groove as a matter of fact does not have much if any sealing material therein.

Sealing material employed in this type of sealing is more or less viscous and is injected into a reservoir. It was presupposed that any leakage, however small, would encourage the sealing material to flow from the reservoir and into the distribution groove with the resultant sealing of the down stream port. It was therefore an amazing discovery to find that the down stream distribution groove, in instances, did not receive sealing material from the reservoir because a small leak through into the down stream flow port also enters the reservoir and a certain type of leak will prevent a substantial differential force being established thereon and, as a consequence, the sealing material would not flow from the reservoir into the down stream distribution groove.

The discovery of such a phenomenon constitutes the basis for the present invention, and it is therefore one of the objects of the present invention to provide a construction wherein a substantial differential pressure will occur in the sealing material distribution system so as to encourage the flow of sealing material from the reservoir into the distribution groove and to thereby quickly create a lubricant seal at the down stream port at low as well as high line pressure.

Valves of this type generally employ an annular lubricant groove that completely surrounds a flow port and provide two concentric metal-to-metal sealing surfaces adjacent the groove, to provide inner and outer sealing areas. A sealing material reservoir exposed to line pressure is connected to the groove so that the sealing material may be conducted to the groove in response to the line pressure. In instances, the metal-to-metal seal of the outer area is inferior to that of the inner metal-to-metal seal. In this situation there would be little differential pressure across the reservoir and, as a result, the system does not provide an automatic lubricant seal.

However, when the opposite condition exists, that is, the metal-to-metal seal of the outer area is better than that of the inner metal-to-metal seal then, in that case, the differential pressure across the reservoir is of a greater value than in the former and is sufficient to provide a lubricant seal automatically. This greater differential pressure is due to the fact that, in the second situation, leakage resistance is greater on the outer area and relatively low on the inner area since, when the valve is in closed position, the inner area bleeds into the down stream zone of greatly lower pressure.

One important object of the invention is to alter the distribution groove and the valve member and seat construction so that there is provided at the down stream seat a pair of annular spaced sealing areas, the inner of which is sealed because of the presence of the sealing material and the outer of which is sealed by virtue of a metal-to-metal seal between the gate and the seat member.

Another object of the invention is to provide a by-pass in the gate when it is in closed position to permit a flow of sealing material from the reservoir and seat through the valve face to the distribution groove.

Another object of the invention is to provide an offset sealing face between the distribution groove and the flow passage to allow relatively free escape of line fluid entrapped in the groove, whereby sealing material may quickly flow from the reservoir into such offset face to maintain a sealing material seal.

Still another object of the invention is to provide the combination of a full-port sealing groove, an inner sealing material seal between the seat and gate, and an outer metal-to-metal seal between the seat and the gate, whereby the distribution groove is disposed between the inner and outer areas thereby to quickly establish and maintain a seal which is assured because of the spaced sealing material seal and the metal-to-metal seal.

Other and further objects of the invention will be readily apparent when the following description is considered in connection with the accompanying drawings, wherein.

Figure 6:
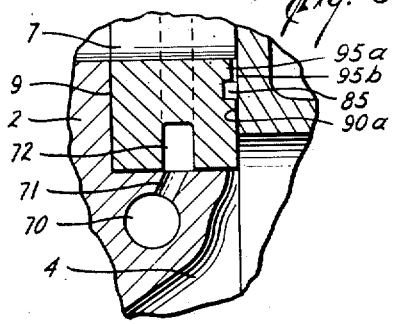

Fig. 6 is an enlarged broken detailed view of the sealing system where, instead of an offset construction of the seat inner area, a simple scratch or vent has been provided in the standard form of inner metal-to-metal seal, whereby the resultant leak will produce an enhanced differential pressure across the barrier of the reservoir sufficiently to cause a flow of the sealing material through the distribution groove and to maintain a sealing material seal.

Figure 1:
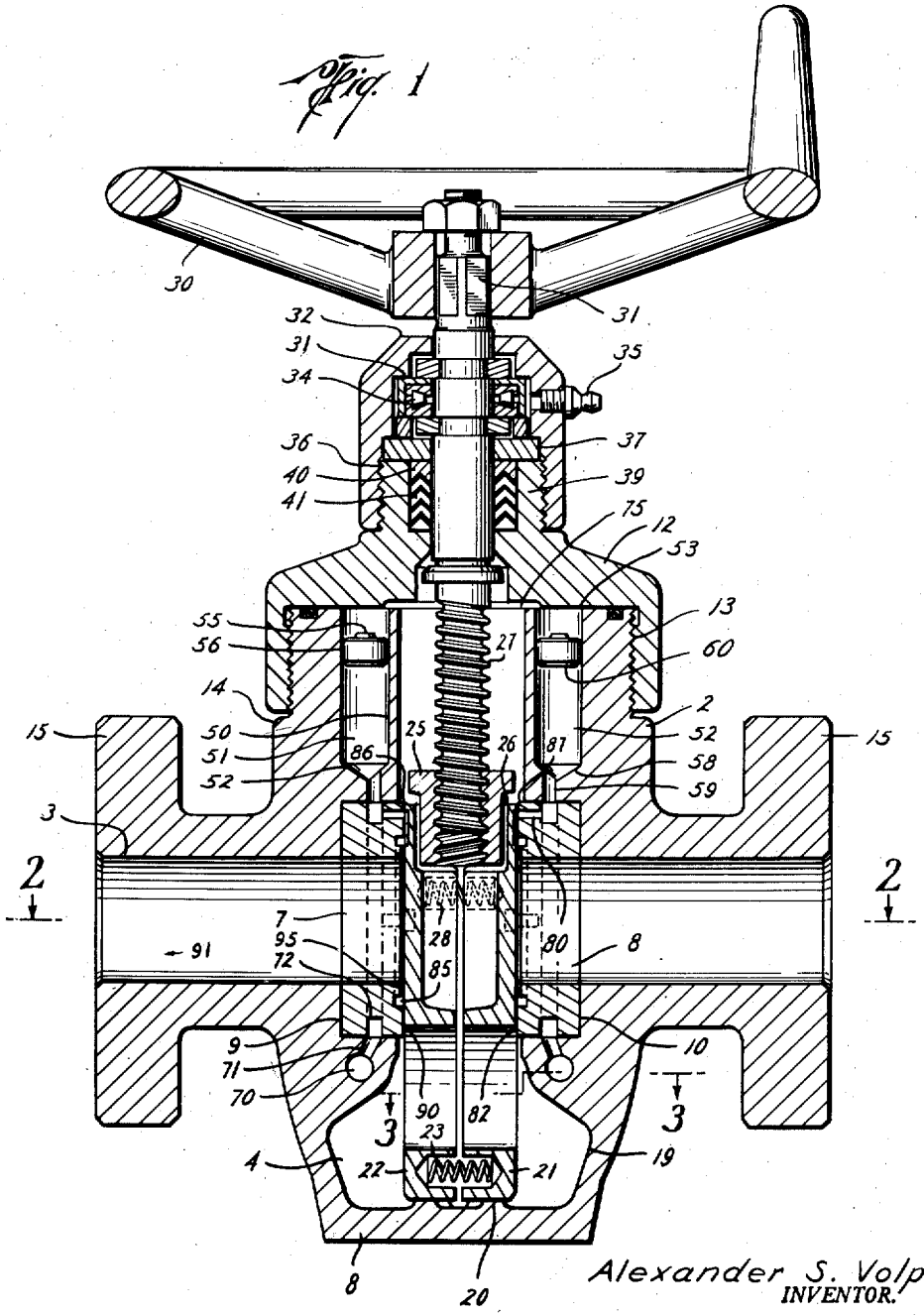
Fig. 1 is a vertical sectional view of the valve, gate, and sealing construction with the gate member in closed position.
Figure 2:
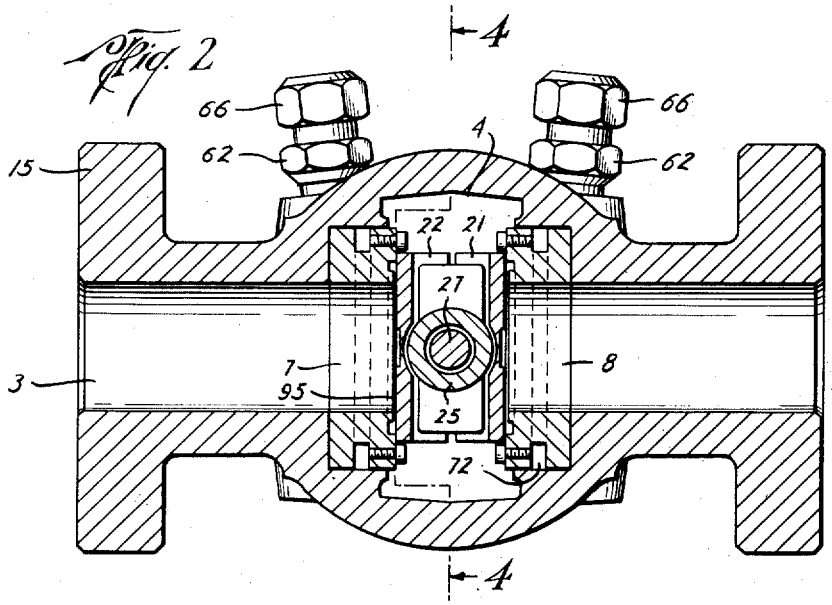
Fig. 2 is a transverse section along the line 2—2 of Fig. 1, looking in the direction of the arrows, and illustrating the by-pass and the offset faces in combination with the metal-to-metal seal as between the gate and the seat.
Figure 4:
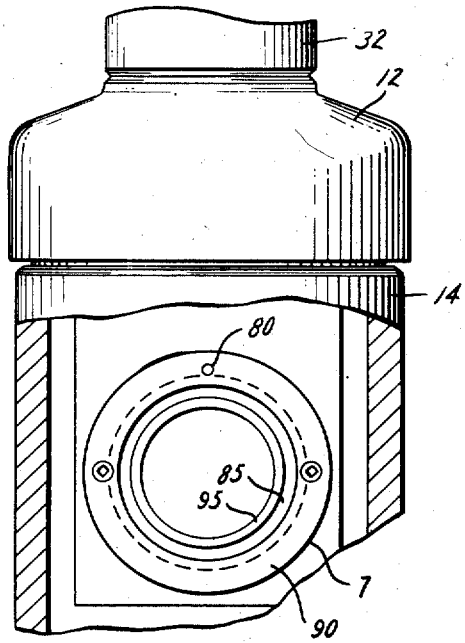
Fig. 4 is a vertical section taken on the line 4—4 of Fig. 2 and illustrating the exposed face of the seat to indicate how the gate member is handled in alignment and the spaced arrangement of the inner lubricant seal, the distribution groove, and the outer metal-to-metal seal.

In Fig. 1 the valve body is shown generally at 2, which body is in the shape of a cross in section as seen in Fig. 1. Such body has a flow passage 3 therethrough which is intersected by the gate chamber 4. In this manner the upstream and downstream flow ports are created, and these ports are in turn identified by the seats 7 and 8, which are arranged on opposite sides of the gate chamber 4 and are shown in the form of annular rings or seats which have been inserted in the recesses 9 and 10, respectively, where the flow passage 3 intersects the gate chamber 4.

The gate chamber 4 is closed by a bonnet 12 which may be threaded at 13 on the upper extension 14 of the body. It is to be understood that such bonnet may be bolted or otherwise connected. The body is arranged to be inserted in a pipeline by connection of the flanges 15 to complementary flanges on the ends of the pipe. Of course, such connection may be threaded as may be desired.

The gate chamber is shown as extended into the base 18 of the body. The stop 20 may be arranged to limit the downward movement of the gate 21 which is arranged for sliding movement within the chamber 4. The gate is preferably made up of two parts 22, which are normally urged apart by suitable springs 23. The two parts are held by the seat rings 7 and 8, and the gate member as such will be raised and lowered by a wing nut 25 which is affixed in the recess 26. A threaded spindle 27 screws [at 28] into the wing nut 25 so that the gate member may be raised or lowered by the rotation of the hand wheel 30 affixed at 31 on the non-circular upper end of the spindle or stem 27. The stem 27 is in turn arranged in a rotatable position by being held against vertical movement by means of the [collars] *collar* 32 [and 33,] arranged on the spindle 27 about the thrust ring 33. A suitable anti-friction bearing 34 serves to reduce the frictional resistance to turning of the stem. A lubricant fitting 35 on the cap 36 may be used when desired, and the cap in turn retains the thrust rings and bearing about the spindle. A packing ring 37 is mounted on the collar 39 while the retainer ring 40 serves to hold the packing 41 in position.

Particular attention is directed to the form of the body 2 in the upper portion of the chamber 4 where the walls 50 are formed as a part of the body and arranged to provide an opening 51 which is in the form of a reservoir to receive the sealing material. Two such reservoirs 52 have been provided, and these reservoirs are open at 53 for the entrance of pressure which may leak into the gate chamber from the high pressure side of the valve. Under such circumstances a high pressure will be exerted on the top 55 of the barriers 56, which are slidably arranged in each of the reservoirs.

Attention is also directed to the construction of the tapered base 58 of each of the reservoirs and the arrangement of the outlet 59 therein. Attention is also directed to the beveled area 60 on the base of each barrier 56 which permits it to seal upon the conical base 58 when the sealing material has been exhausted from the reservoir.

Figure 3:
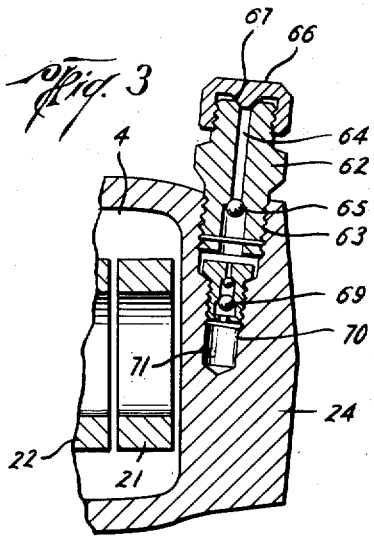
Fig. 3 is a broken detailed sectional view illustrating the manner of introducing the sealing material through a fitting into the area provided between the seat and the body.

Fig. 3 illustrates a broken sectional view of the body 2, the gate chamber 4, and the gate member parts 22 and 21.

Fig. 3 shows a fitting 62 which is threaded at 63 into an opening in the body whereby an inlet 64 for lubricant is sealed by a check valve 65 when the cover 66 is removed to release the seal 67, when sealing material is to be introduced.

The back pressure ball valve 69 prevents the back flow of the lubricant after it has passed into the inlet 70 and thence to the sealing material passage 71 from the fitting into the depression 72 in the seat ring 7 or 8, as the case may be.

It seems obvious that when sealing material is introduced through the fitting 62 such material will flow through the inlet 70 and the sealing material passage 71. From the passage 71 the sealing material will in turn flow around the seat ring 7 through the groove 72, which is arranged in the periphery of the seat ring, which seats in the recess or counterbore 9. This groove 72 is in the form of an annular recess around the seat ring and is arranged for alignment with the outlet 59. As a matter of fact, while 59 has been designated as an outlet, it is so employed when the flow of the sealing material is out of the reservoir for distribution, but when sealing material is being introduced from the fitting 62, as now being described, the outlet is as matter of fact an inlet because the sealing material will move into the bottom of the reservoir against the barrier 56 and in this manner elevate the barrier until the reservoir is filled.

When, however, the valve is to be used for a commercial application, the reservoir will be first filled by the procedure just described.

When the valve is placed in a flow line and properly connected, there will be leakage of high pressure fluid from the high pressure side of the valve from which, it is maintained, such pressure will leak through the up stream seat and into the gate chamber 4. Such leakage will, of course, bleed over through the depression 75 in the bonnet 12 so that such high pressure will be in evidence in the reservoir 52.

As heretofore indicated, it was believed that in commercial operation the high pressure in the gate chamber being exerted upon the barrier in the down stream reservoir would cause the barrier to move the discharge sealing material into the down stream distribution groove, under all leaking conditions.

The pathway from the peripheral groove 72 will be through the conduit 80 in the seat rings 7 and 8 to the face 82 of each ring which is exposed in the gate chamber in such manner that the parts 21 and 22 of the gate will contact the seat rings.

Gate valves heretofore employed a distribution groove 85, disposed in the face of the seat and in cooperation with the face of the gate member the sealing material is distributed to establish a lubricant seal. As indicated, heretofore it has been discovered that at low leakage such groove does not as a matter of fact always automatically fill with sealing material, as has heretofore been understood or expected, and actual inspection of many supposedly lubricated valves has proven beyond argument that in many instances the sealing material never reaches the distribution groove, such as 85.

Figure 5:
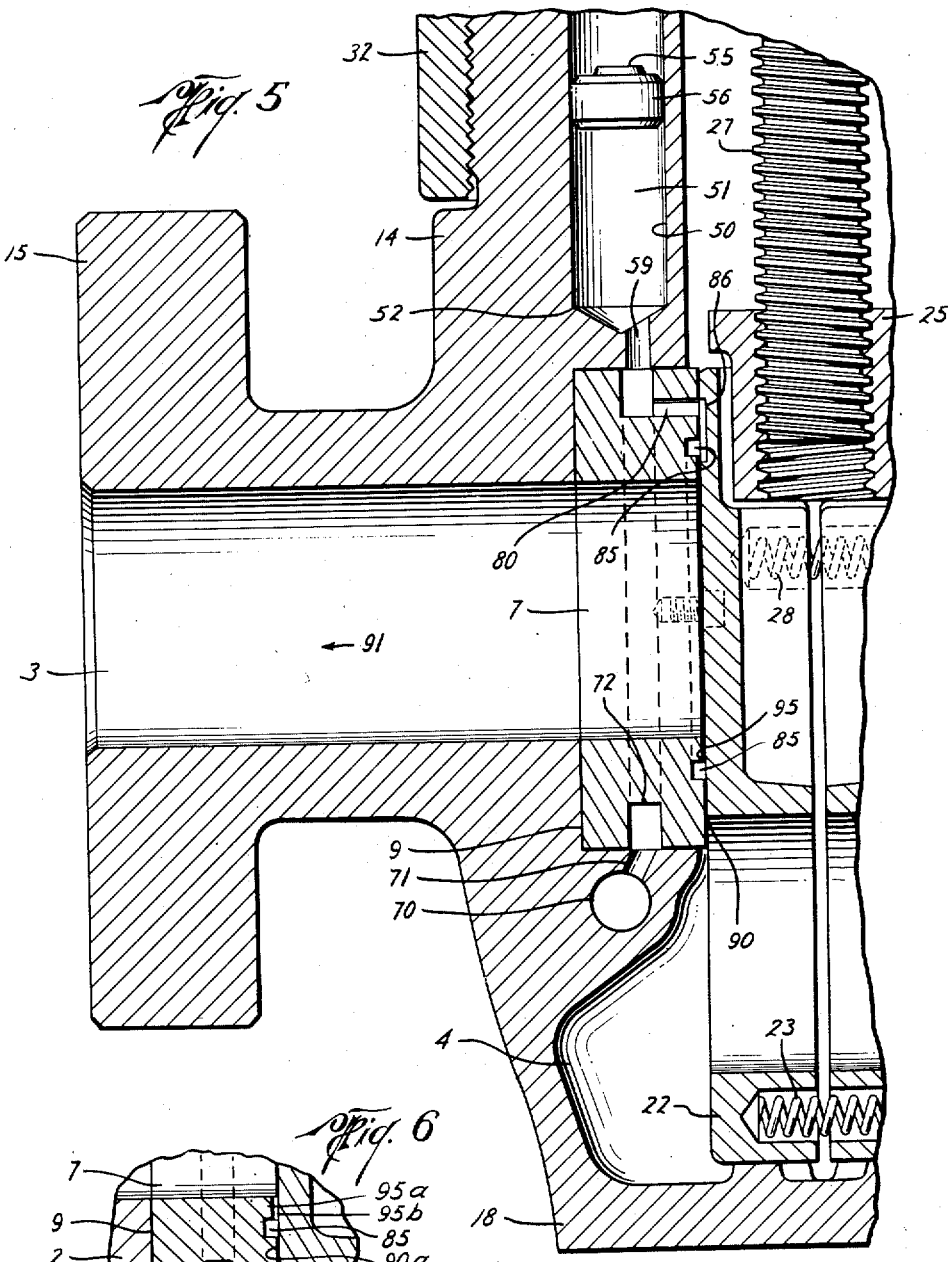
Fig. 5 is an enlarged and broken detailed sectional view of the body reservoir, outlet from the reservoir into the seat, and the conduit through the seat member to the by-pass in the gate face and the arrangement of the sealing material distribution groove.

In the present construction, therefore, the arrangement of the structure has been somewhat modified, and to insure that there will be a flow of reservoir stored sealing material through the conduit 80, there has been provided a by-pass depression or slot 86 in the exposed face of each of the gate parts and, as best seen in Fig. 5, provides communication between the conduit 80 of each seat with distribution grooves 85 when the gate member is in closed position. By producing by-pass 86 in the gate face, when the gate is raised to open the valve, communication will be cut off between by-pass 86 and groove 85, thereby preventing loss of lubricant sealing material into the flow passage.

This by-pass is so arranged that there remains a metal-to-metal seat 87 as a peripheral area around the outside of the distribution groove 85, as seen in Fig. 1. In other words, with the springs *23* [20] urging the gate parts away from each other and against the seat, there will be a metal-to-metal contact between the gate parts and the seats to prevent leakage. It is to be understood, however, that line pressure against the down stream gate part establishes a high unit stress of metal-to-metal contact.

Of course, at the upstream seat the high pressure against the exposed part of the gate member will probably cause the upstream gate part to be moved away from the seat and leakage of the high pressure will enter into the gate chamber. Such high pressure is then available in the gate chamber and between the gate parts, and will tend to force the gate part 22 against the down stream seat. In this manner there will be a metal-to-metal seat at 90 on the down stream flow port, the direction of flow being indicated by the arrow 91. This merely illustrates the operation of the sealing system with the pressure applied to the right side of the valve. Since the valve is equipped with an independent sealing system at each flow port the valve will be sealed at the right flow port in the manner above indicated, the line pressure to be applied to the left side.

The particular advantage of the present invention resides in the arrangement for the relatively free moving of the sealing material through the conduit 80, the by-pass 86, and thence into the distribution groove 85.

In this manner, if there is sufficient differential pressure across the barrier 56, then the barrier will move down and in turn move sealing material through the outlet 59 and the conduit 80 to the by-pass 86, and thence into the distribution groove 85. Heretofore, it was understood that the disposition of the groove 85 in the seat 7, regardless of whether a removable seat such as the ring 7 were provided or whether an integral seat were created in the body of the valve, there has always been a metal-to-metal seal between the gate and the seat at the inner and outer peripheries of the groove 85.

It was believed that such inner peripheral metal-to-metal contact between the gate and the seat was a necessary structure to prevent the escape of sealing material into the down stream flow line 3. Such a metal-to-metal seat inside of the distribution groove, as a matter of fact, has been found not only to be an objectionable feature but to be absolutely unnecessary, because of the conception of the present invention whereby the area inside of the seat ring interiorly of the groove 85 is shown as being cut away or offset at 95 in order to provide a spaced depression through which sealing material from the reservoir may be fed quickly and automatically into the interstice between the adjacent faces of the seat and gate created by this depression.

The quick movement of sealing material caused by this depression 95 has been found to be of substantial help because in this manner any leakage from groove 85 into the down stream flow line serves to permit movement interiorly of the viscous sealing material to such an extent that there is sufficient differential force at relatively low line pressures to insure a flow of lubricant material into the distribution groove, assuring that such sealing material will flow through the by-pass, the conduit, the depression, the outlet, all connected from the reservoir 51 below the barrier 56.

As a matter of fact it has been found that, where there is sufficient leakage to encourge movement of the sealing material, the pressure on the lower side of the barrier 56 is reduced sufficiently that the high pressure which has leaked into the gate chamber there will, as a matter of fact, be created a sufficient differential pressure across the barrier 56 to cause quick feeding of the sealing material in accordance with the leakage into the down stream flow line of line fluid trapped in groove 85.

Actual tests of the above-described theory have been proven beyond question, because in actual tests observation through the flow passage 3 indicates that only a very small ring of sealing material will appear between the gate and the offset surface 95, and that upon increase in the pressure on the high pressure side of the valve there is not any additional leakage of sealing material once the sealing material seal has been created. Of course, any increase in the high pressure leaking into the gate chamber will be sealed also by the metal-to-metal seal at 90 and the increase in the high pressure within the gate chamber 4. In actual practice the spacing of the depression 95 to the gate face is in the order of .002 or less, which in cooperation with the viscous sealing material used insures a reliable and stable lubricant seal.

In an actual test, the application of the normal city water pressure of 60 pounds per square inch was found to be sufficient to not only fill the distribution groove because of the differential pressure but to form a small bead of sealing material at 90 between the gate and the flow passage at the offset area. Further increase of the high pressure to more than 10,000 pounds per square inch from 60 pounds did not cause any substantial change in the bead of sealing material, because of the close spacing of depression 95 which stopped the leak and in this manner obviated the escape of any additional sealing material into the down stream flow line.

In this embodiment illustrated in Figs. 1 to 5, the annular axially off-set or recessed area 95 provides the desired channel between groove 85 and the flow passage through the seat ring. Fig. 6 illustrates another embodiment wherein the inner annular sealing surface 95*a* is made flush with outer surface 90*a* but a shallow radial vent or channel 95*b* is formed in the face of surface 95*a* to provide communication between groove 85 and the flow passage through the seat rings. Channel 95*b* forms a leak port between the seat faces and the adjacent gate face to provide the desired pressure differential which will assure movement of sealing material into groove 85 from reservoir 51.

Broadly, the invention contemplates the provision of an offset portion on the inner annular segment of the seat surface so as to provide a sealing material seal between the seat and the gate *or other closure member* in combination with a metal-to-metal seal between the seat and the gate *or closure member.*

What is claimed is:

1. A lubricated gate valve, comprising, a body having a flow way therethrough, a gate reciprocable in the body across said flow way, an annular seat in said flow way having an annular sealing face slidably engageable by a side face of the gate, a continuous annular lubricant groove in said sealing face surrounding said flow way, said groove being disposed intermediate the inner and outer margins of the sealing face to form separate inner and outer concentric gate-sealing areas, a pressure-leak channel extending across said inner sealing area providing communication between said groove and said flow way, a lubricant reservoir in said body exposed to fluid pressure therein, and means responsive to the fluid pressure in said body to convey lubricant from said reservoir to said groove.

2. A lubricated gate valve, comprising, a body having a flow way therethrough, a gate reciprocable in the body across said flow way, an annular seat in said flow way having an annular sealing face slidably engageable by a side face of said gate, a continuous annular lubricant groove in said sealing face surrounding said flow way, said groove being disposed between the inner and outer margins of the sealing face to form separate inner and outer concentric gate-sealing areas, said inner area being axially depressed slightly with respect to said outer area to form a shallow annular pressure-leak channel between said inner area and the adjacent portion of the side face of the gate providing communication between said groove and the flow way, a lubricant reservoir in said body exposed to fluid pressure therein, and means responsive to the fluid pressure in said body to convey lubricant from said reservoir to said groove.

3. A lubricated gate valve, comprising, a body having a flow way therethrough, a gate reciprocable in the body across said flow way, an annular seat in said flow way having an annular sealing face slidably engageable by a side face of said gate, a continuous annular lubricant groove in said sealing face surrounding said flow way, said groove being disposed between the inner and outer margins of the sealing face to form separate inner and outer concentric gate-sealing areas, a radial pressure-leak channel in the surface of said inner area providing communication between said lubricant groove and the flow way, a lubricant reservoir in said body exposed to fluid pressure therein, and means responsive to the fluid pressure in said body to convey lubricant from said reservoir to said groove.

4. A lubricated gate valve, comprising, a body having a flow way therethrough, a gate reciprocable in the body across said flow way, an annular seat in the flow way having an annular sealing face slidably engageable by a side face of the gate, a continuous annular sealing lubricant groove in said sealing face surrounding said flow way, said groove being disposed between the inner and outer margins of the sealing face to form separate inner and outer gate-sealing areas, a pressure-leak channel extending across said inner sealing area providing communication between said groove and said flow way, a sealing lubricant reservoir in said body exposed to fluid pressure therein, a lubricant passage extending between said reservoir and the outer surface of said outer area at a point spaced from said groove, a by-pass channel in the side face of said gate providing communication between the outer end of said passage and said groove when said gate is in the closed position, said by-pass channel being movable by movement of the gate to the valve-opening position to cut off communication between said lubricant passage and said groove, and means responsive to variations in fluid pressure in said body on the upstream side of said gate to apply corresponding pressure to the sealing lubricant in said reservoir.

*5. A lubricated valve, comprising, a body having a flow way therethrough, a closure member movably mounted in said body to open and close said flow way, said flow way having an annular sealing face engageable by a cooperating sealing face on the closure member when the latter is in closed position, a continuous annular lubricant groove between said sealing faces surrounding said flow way, said groove being disposed intermediate the inner and outer margins of the sealing faces to form separate inner and outer sealing areas, a pressure-leak channel extending across said inner sealing area providing communication between said groove and said flow way, a lubricant reservoir exposed to fluid pressure in said body, and means responsive to the fluid pressure in said body to convey lubricant from said reservoir to said groove.*

*6. A lubricated valve, comprising, a body having a flow way therethrough, a closure member movable in the body to open and close said flow way, said flow way having an annular sealing face engageable by a cooperating sealing face on the closure member, a continuous annular lubricant groove between said sealing faces surrounding said flow way, said groove being disposed between the inner and outer margins of the sealing faces to form separate inner and outer sealing areas, at least a portion of said inner area being axially depressed slightly with respect to said outer area to form a shallow*

*pressure leak channel between said inner area and the adjacent portion of said closure member to thereby provide communication between said groove and the flow way, a lubricant reservoir exposed to fluid pressure in the body, and means responsive to the fluid pressure in said body to convey lubricant from said reservoir to said groove.*

*7. A lubricated valve, comprising, a body having a flow way therethrough, a closure member movably mounted in said body to open and close said flow way, said flow way having an annular sealing face engageable by a cooperating sealing face on the closure member when the latter is in closed position, a continuous annular lubricant groove in one of said sealing faces surrounding said flow way, said groove being disposed intermediate the inner and outer margins of the sealing face to form inner and outer sealing areas, at least a portion of said inner area being axially depressed slightly with respect to said outer area to form a shallow pressure leak channel between said inner area and the adjacent portion of the other sealing face to thereby provide communication between said groove and said flow way, a lubricant reservoir exposed to fluid pressure in the body, and means responsive to the fluid pressure in said body to convey lubricant from said reservoir to said groove.*

*8. A lubricated valve, comprising, a body having a flow way therethrough, a closure member movably mounted in said body to open and close said flow way,*

*said flow way having an annular sealing face engageable by a cooperating sealing face on the closure member when the latter is in closed position, a continuous annular lubricant groove in one of said sealing faces surrounding said flow way, said groove being disposed intermediate the inner and outer margins of the sealing face to form inner and outer sealing areas, said inner area being axially depressed slightly with respect to said outer area to form a shallow annular pressure-leak channel between said inner area and the adjacent portion of the side face of the closure providing communication between said groove and the flow way, a lubricant reservoir exposed to fluid pressure in the body, and means responsive to the fluid pressure in said body to convey lubricant from said reservoir to said groove.*

References Cited in the file of this patent or the original patent

UNITED STATES PATENTS

| | | |
|---|---|---|
| 1,608,519 | Nordstrom | Nov. 30, 1926 |
| 1,980,768 | Specht | Nov. 13, 1934 |
| 2,109,654 | Stevens | Mar. 1, 1938 |
| 2,421,879 | Hamer | June 10, 1947 |
| 2,433,638 | Volpin | Dec. 30, 1947 |
| 2,568,935 | Smith | Sept. 25, 1951 |
| 2,591,031 | Volpin | Apr. 1, 1952 |
| 2,653,789 | Eichenberg | Sept. 29, 1953 |
| 2,657,898 | Volpin | Nov. 3, 1953 |